3,786,083
PROCESS FOR THE PREPARATION OF ACYL SUCCINIC ACID DIALKYL ESTERS

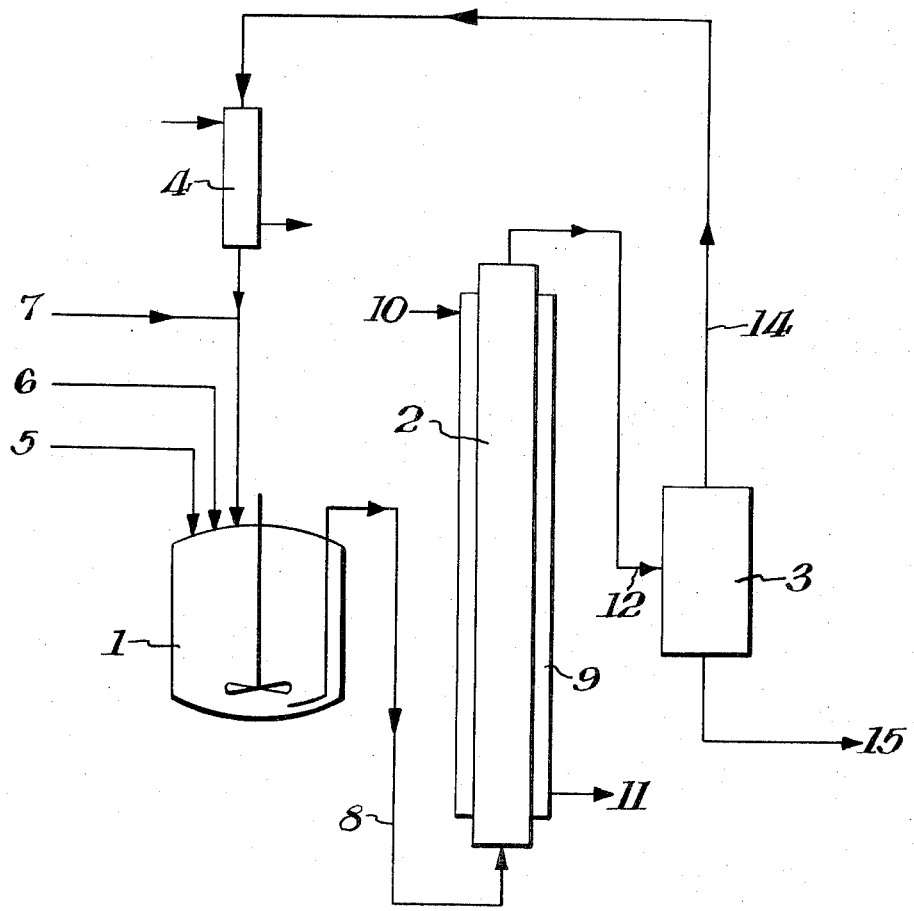

Ewald Schmidt, Bischofsheim, Hanswilli von Brachel, Leopoldshohe, Rolf Müller, Frankfurt am Main, and Horst Kindler, Frankfurt am Main-Fechenheim, Germany, assignors to Cassella Farbwerke Mainkur Aktiengesellschaft, Frankfurt am Main-Fechenheim, Germany
Filed Nov. 3, 1972, Ser. No. 303,491
Claims priority, application Germany, Nov. 8, 1971, P 21 55 360.6
Int. Cl. C07c 67/00
U.S. Cl. 260—483      5 Claims

ABSTRACT OF THE DISCLOSURE

Reaction of an excess of an aldehyde and maleic acid dialkyl ester to produce the title product wherein the reaction components are continuously conducted through a reactor and the supply rate thereof and the heat elimination of the reactor are regulated to obtain the desired reaction temperature and residence time.

---

This invention relates to a process for the preparation of acyl succinic acid dialkyl esters of the formula:

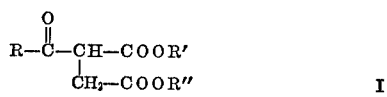

wherein R, R' and R" are alkyl having 1 to 8 carbon atoms, and preferably methyl, ethyl, propyl or butyl, by the reaction of an excess of an aldehyde of the formula:

R—CHO          II with a maleic acid dialkyl ester of the formula:

at elevated temperature in the presence of a free radical initiator.

In the process of this invention the reactants are continuously conducted through a reactor while regulating the feed rate thereof and eliminating the heat of reaction in such manner that the required reaction temperature and residence time in the reactor are maintained.

It is known that pyrazolone(5)-3-carbonic acid derivatives and pyrazolone-azo dyestuffs may be synthesized from acyl succinic acid dialkyl esters of Formula I and diazonium compounds (U.S. Pats. Nos. 2,459,226 and 2,457,823). However, the synthesis of pyrazolone carbonic acids and their derivatives has achieved no technical importance because the acyl succinic acid dialkyl esters necessary as starting products have not heretofore been obtainable on a commercial scale in an economic manner. For this reason, the pyrazolone carbonic acids have so far been commercially synthesized from substituted arylhydrazines and from oxalacetic esters. The latter process is unsatisfactory, however, because the oxalacetic ester is relatively expensive and the preparation of the arylhydrazines from the corresponding aryldiazonium compounds is often beset with difficulties.

Acetyl succinic acid ester may be prepared by the alkylation of sodium acetoacetic ester with chloroacetic ester. (Organic Synthesis Coll., vol. II, p. 262). This process, however, is economically unsatisfactory because of a low yield and a plurality of by-products which necessitate purification by careful rectification.

In another known process for the preparation of acyl succinic acid dialkyl ester (U.S. Pat. 2,577,133 and J. Org. Chem. 17, 1009–1010 (1952)), an aldehyde RCHO is discontinuously reacted with a maleic acid dialkyl ester at temperatures of 25–150° C. The reaction is catalyzed by an organic peroxide as the free radical initiator. The molar ratio between aldehyde and maleic acid dialkyl ester is 1:1 to 20:1. Molar ratios of more than 10:1 are preferred in order to improve the yield and suppress the formation of undesired telomers. Unfortunately, long reaction times of 30 hours and more are required. Since, in order to initiate the reaction, free radicals have to be present, the addition of a radical initiator in the form of an organic peroxide is required. The reaction mixture must first, therefore, be heated to such a degree that radicals in an amount sufficient for starting the reaction are obtained by the disintegration of the organic peroxide. This temperature is, for example, 80–90° C. for benzoyl peroxide. The reaction then becomes strongly exothermic and the resulting rapid temperature rise may cause the free radical reaction, particularly in a large scale reaction, to go out of control in an explosion-like manner. It is furthermore disadvantageous that, at best, only 81% yields are achieved. The stated circumstances are the reasons why this process has not so far found commercial acceptance.

It has now been unexpectedly found that aldehydes of Formula II may be safely reacted in a few minutes with maleic acid dialkyl esters of Formula III in the presence of a free radical initiator on a commercial scale, if desired, to obtain the acyl succinic acid esters of Formula I. The yield obtained may be unexpectedly 90% and more and the content of telomers is so small that the reaction product, after distilling off excess aldehyde, may be used, in many instances, for further reactions without further processing.

The novel process guarantees a simple and safe course of reaction, even on a commercial scale. The starting components, i.e., aldehyde of Formula II, maleic acid dialkyl esters of Formula III and the free radical initiator, are continuously introduced into a reactor which is maintained at reaction temperature. For the sake of expediency, the free radical initiator is dissolved in the maleic acid dialkyl ester prior to entering into the reactor. The three components, aldehyde, maleic acid dialkyl ester and free radical initiator, may also be mixed prior to their introduction into the reactor. The reaction components are then continuously introduced into the reactor in the form of a mixture. After start-up, heating of the components conducted into the reactor is no longer required.

The heat of reaction obtained in the reactor is utilized by the continuously supplied starting materials and cooling is employed in such a manner that the desired reaction temperature is maintained in the reactor. The feed rate of the reaction components and the heat removal of the reactor effected by cooling are controlled so that the required reaction temperature and residence time in the reactor are obtained. With low-boiling aldehydes, a pressure must be maintained in the reactor above the vapor pressure of the aldehyde at the reaction temperature in the mixture.

Suitable reactors include all vessels which permit controlled heat exchange and which also permit operating under sufficient pressure in the event of using a low-boiling aldehyde. The exterior form of the reactors and their volumes may vary over a wide range. Suitable, for example, are autoclaves with or without agitators and pipes or pipe systems with a diameter of about 1–100 cm. and a length of about 30–300 cm.

The reaction temperature depends on the type of free radical initiator used. It is approximately selected so that the free radical initiator is substantially decomposed into radicals during its stay in the reactor. Consequently, at higher temperatures, shorter durations of stay of the reaction mixture in the reactor are sufficient. Suitable reaction temperatures are between 80 and 200° C., and preferably between 100 and 180° C.

A catalytic amount of all compounds which decompose into radicals at the reaction temperature may be used as free radical initiators for producing the radicals which release the reaction chains. Organic peroxides are preferred, e.g., benzoyl peroxide and dichlorobenzoyl peroxide. A substantially complete conversion of the maleic acid ester is effected by 0.5 to 5 mol percent radical initiator, based on the weight of the maleic acid dialkyl ester.

In order to prevent formation of large amounts of telomers in the reaction, the aldehyde is preferably used in excess. Unexpectedly, in the novel process yields of over 90% are achieved with the use of but a double molar excess of aldehyde, with a portion of telomers distinctly smaller as compared to the known processes. The novel process thus unexpectedly yields purer products in a higher yield than the previously known process. Normally, in the novel process the aldehyde is used in a single to a quadruple molar excess. Preferably, the excess aldehyde is continuously distilled off, after the passage of the reaction mixture through the reactor and is recycled again into the process.

The reaction time, i.e., the residence time in the reactor, becomes shorter in the novel process and amounts to about 1 to 20 minutes. Longer residence times in the reactor are possible but not required. Normally, the residence time is between 5 and 15 minutes.

The products produced according to the novel process contain less than 1% unreacted maleic acid dialkyl esters because of the high conversion thereof. Since the portion of telomers is also small, the acyl succinic acid dialkyl esters obtained after distilling off excess aldehyde are generally so pure that they may be used in this form immediately for further reactions.

The invention is further explained by way of the attached drawing. The drawing shows, in an exemplary and schematic fashion, a flow diagram of an installation for the execution of the process of the present invention.

The installation consists essentially of mixing device 1, reactor 2, distillation device 3 and cooler 4. Through conduit 5, there are added by metering to mixing device 1, provided with agitator, maleic acid dialkyl ester of Formula III; through conduit 6, the radical initiator; and through conduit 7, the aldehyde of Formula II. The starting components are intermixed in the mixing device 1. The composition of the starting components is then introduced through conduit 8 into reactor 2, which is provided with a cooling jacket 9. Cooling jacket 9 of reactor 2 has a coolant flowing therethrough which enters through conduit 10 and leaves by way of conduit 11. The supply of the starting component through conduit 8 and the cooling of the reactor are regulated so that the desired temperature is maintained in the reactor. Residence in the reactor may be very short. Times of longer than 20 minutes are not required. The reaction mixture leaves the reactor 2 by way of conduit 12 through which it is introduced into the distillation device 3. The easily volatile aldehyde is distilled off in the distillation device 3 and conducted by way of conduit 14 through cooler 4 and subsequently brought back into conduit 7. The prepared acyl succinic acid ester leaves the distillation device through conduit 15 for further use. In the reaction of easily volatile aldehydes, the reaction is carried out under pressure and the distillation is carried out after the release of pressure. Valves, metering devices, pumps, heat sources, etc. are conventional and not indicated in the flow diagram.

EXAMPLE 1

In a mixture of 775 g. maleic acid diethyl ester and 594 g. acetaldehyde, there are dissolved 10 g. benzoyl peroxide. Then the mixture is compressed within 60 minutes with a feed pump under a pressure of about 25 atmospheres gauge through a 300 ml. VA autoclave, which has an inside temperature of 120° C. The average residence time in the autoclave is 12 minutes. The reaction mixture is then released through a pressure holding valve into the bell of a distillation apparatus, heated to 120° C. In this apparatus, the excess acetaldehyde is continuously distilled off into a receiver cooled with ice water. Recovered are 344 g. acetaldehyde. The crude product remaining as residue is then freed of residual acetaldehyde by evacuation up to a final pressure of 20 mm. mercury. Subsequently, at 20 mm., the product is distilled without a decline in flow rate at a bath temperature of up to 220° C.

Obtained are 917 g. of a product having a boiling point of 146–170° C./20 mm. (the large boiling range of the pure product is caused by a keto-enol-tautomerism) which is, according to gas chromatogram, 97.5% acetyl succinic acid diethyl ester. This is equivalent to 92% yield, based on the maleic acid diethyl ester reaction component used.

With the same test arrangement and with the same molar proportions, there are obtained a 92% yield, from maleic acid dibutyl ester and acetaldehyde, of acetyl succinic acid dibutyl ester (B.P.=180–188° C./20 mm.) and a 90% yield of butyryl succinic acid diethyl ester (B.P.=121–125° C./2 mm.) from maleic acid diethyl ester and butyraldehyde.

EXAMPLE 2

Maleic acid dimethyl ester, wherein 1.3% by weight benzoyl peroxide are dissolved, and acetaldehyde are forced through a 3 l. VA autoclave by means of a feed pump in a molar ratio of 1:3 under a pressure of 20–25 atmospheres gauge while stirring. The rate of the feed is regulated so that a total volume of 18 liters per hour is fed with an average residence time of the reaction mixture in the autoclave of 10 minutes. The autoclave is initially heated to 130° C. by circulation heating. Once the feeding has begun, the temperature of the circulation heating is lowered to such an extent that the temperature is kept at 130° C. in the autoclave. The reaction product is conducted through a pipe 130 cm. long and 500 ml. capacity, wherein a temperature of 130° C. prevails. Thereafter, the composition is released by means of a pressure holding valve into a receiver heated to 120° C., from which the excess acetaldehyde is continuously distilled off. It is condensed over a cooler at 0–10° C. (iced water) and recycled into the process. The reaction product flows off continuously through an overflow device. It contains a residual content of about 5% by weight of acetaldehyde which, by a slow application of vacuum, is completely removed up to a final pressure value of 20 mm. mercury.

Using 26.45 kg. (=23.02 l.) maleic acid dimethyl ester (=0.184k mol) there are obtained, in 3 hours, 34.6 kg. crude product with a content of 94% of acetyl succinic acid dimethyl ester. For a determination of the content, an assay of the crude product is distilled off at vacuum of 10–12 mm. up to a bath temperature of 200° C. and the content of acetyl succinic acid dimethyl ester in the distillate is gas chromatographically determined.

In the foregoing examples, the present data relate to percent by weight.

We claim:
1. In the process of preparing an acyl succinic acid dialkyl ester of the formula

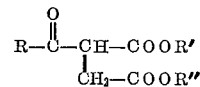

wherein R, R' and R" are alkyl having 1 to 8 carbon atoms by the reaction of an excess of an aldehyde of the formula

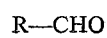

with a maleic acid dialkyl ester of the formula $$\begin{array}{c} CH-COOR' \\ \| \\ CH-COOR'' \end{array}$$

at elevated temperature in the presence of a free radical initiator, the improvement wherein the reaction components are continuously conducted through a reactor and the supply rate of the reaction components and the heat elimination of the reactor are so regulated that a reaction temperature of from 80 to 200° C. and a residence time in the reactor of from about 1 to 20 minutes are maintained.

2. The process of claim 1 wherein R, R' and R'' are methyl, ethyl, propyl or butyl.

3. The process of claim 1 wherein the reaction components are conducted through the reactor within 5 to 15 minutes.

4. The process of claim 1 wherein the reaction temperature is maintained between 100 and 180° C.

5. The process of claim 1 wherein the aldehyde is used in a single to a quadruple molar excess.

References Cited
UNITED STATES PATENTS

| | | | |
|---|---|---|---|
| 2,577,133 | 12/1951 | Ladd | 260—483 |
| 2,653,911 | 9/1953 | Fields et al. | 260—483 |
| 2,665,304 | 1/1954 | Patrick | 260—483 |
| 3,538,147 | 11/1970 | Morita et al. | 260—483 |

VIVIAN GARNER, Primary Examiner